(12) United States Patent
Chu

(10) Patent No.: US 9,759,360 B2
(45) Date of Patent: Sep. 12, 2017

(54) OPENABLE CORRUGATED HOSE, CABLE HARNESS AND METHOD FOR PRODUCING AN OPENABLE CORRUGATED HOSE OF THIS KIND

(71) Applicant: Schlemmer GmbH, Poing (DE)

(72) Inventor: Van Ngoc Chu, Poing (DE)

(73) Assignee: Schlemmer GmbH, Poing (DE)

( * ) Notice: Subject to any disclaimer, the term of this patent is extended or adjusted under 35 U.S.C. 154(b) by 0 days.

(21) Appl. No.: 15/219,223

(22) Filed: Jul. 25, 2016

(65) Prior Publication Data

US 2017/0030498 A1 Feb. 2, 2017

(30) Foreign Application Priority Data

Jul. 27, 2015 (DE) .................. 10 2015 112 231
Jul. 28, 2015 (DE) .................. 10 2015 112 272

(51) Int. Cl.

| | |
|---|---|
| *H02G 3/04* | (2006.01) |
| *F16L 25/00* | (2006.01) |
| *B21C 37/12* | (2006.01) |
| *F16L 9/06* | (2006.01) |
| *H01B 7/00* | (2006.01) |

(Continued)

(52) U.S. Cl.
CPC ........ *F16L 25/0036* (2013.01); *B21C 37/121* (2013.01); *F16L 9/06* (2013.01); *F16L 9/19* (2013.01); *F16L 9/22* (2013.01); *H01B 7/0045* (2013.01); *H02G 3/0468* (2013.01)

(58) Field of Classification Search
CPC ...... H02G 3/04; H02G 3/0406; H02G 3/0462; H02G 3/0468; H02G 3/06; B60E 16/0215; B60E 16/0207; H01B 7/0045; F16L 5/00; F16L 9/22; F16L 7/00; F16L 9/06; F16L 11/00; F16L 25/0036; B60R 16/0215; B60R 16/0207; B21C 37/121

USPC ............. 174/72 A, 68.1, 68.3, 72 C, 36, 92, 174/72 TR, 88 R, 70 C; 138/121, 118, 138/156, 128, 169, 162, 166, 167, 168, 138/109; 248/73, 74.2, 74.1, 205.2, 248/205.3, 205.6, 49, 68.1

See application file for complete search history.

(56) References Cited

U.S. PATENT DOCUMENTS

| | | | |
|---|---|---|---|
| 4,513,787 A | 4/1985 | Hegler et al. | |
| 6,488,053 B1 * | 12/2002 | Tadokoro | H02G 3/0468 174/92 |
| 6,938,645 B2 | 9/2005 | Domingues Duarte et al. | |

(Continued)

FOREIGN PATENT DOCUMENTS

| | | |
|---|---|---|
| DE | 3640226 A1 | 6/1988 |
| EP | 0114213 A2 | 8/1984 |

(Continued)

*Primary Examiner* — Angel R Estrada
(74) *Attorney, Agent, or Firm* — Alleman Hall Creasman & Tuttle LLP

(57) ABSTRACT

The present invention provides an openable corrugated hose for accommodating lines, comprising: a first corrugated hose shell, a second corrugated hose shell, a joint section, at which the first corrugated hose shell and the second corrugated hose shell are each connected to one another pivotably in a first end section, and a lip section, which is provided on a second end section of at least one of the corrugated hose shells, wherein the lip section is manufactured from a different material than the corrugated hose shells.

19 Claims, 8 Drawing Sheets

(51) Int. Cl.
*F16L 9/19* (2006.01)
*F16L 9/22* (2006.01)

(56) References Cited

U.S. PATENT DOCUMENTS

| | | | | |
|---|---|---|---|---|
| 7,045,709 B2* | 5/2006 | Koike | ............... | H02G 3/0468 |
| | | | | 174/68.1 |
| 7,388,149 B2* | 6/2008 | Doherty | ............... | H02G 9/06 |
| | | | | 174/21 JS |
| 7,891,383 B2* | 2/2011 | Baverel | ............... | H02G 3/0468 |
| | | | | 138/121 |
| 9,263,866 B2* | 2/2016 | Shimizu | ............... | H02G 3/0468 |
| 2009/0140105 A1 | 6/2009 | Baverel et al. | | |

FOREIGN PATENT DOCUMENTS

| | | |
|---|---|---|
| FR | 2935555 A1 | 3/2010 |
| JP | 2000287331 A | 10/2000 |
| JP | 2015037333 A | 2/2015 |
| WO | 2008003485 A1 | 1/2008 |

\* cited by examiner

OPENABLE CORRUGATED HOSE, CABLE HARNESS AND METHOD FOR PRODUCING AN OPENABLE CORRUGATED HOSE OF THIS KIND

The present invention is directed to an openable corrugated hose for accommodating lines. The invention further includes a method for producing an openable corrugated hose of this kind.

Corrugated hoses or corrugated tubes can be used especially in motor vehicle construction as protective tubes for lines such as electric cables. In this case, the lines are pulled or pushed through the circumferentially closed corrugated hose for the purpose of installation. To facilitate the installation of lines in corrugated hoses of this kind, they can be of openable design.

EP 2 035 735 B2 describes an openable corrugated hose having a first corrugated hose shell and a second corrugated hose shell, which are connected to one another pivotably with the aid of a hinge section. The corrugated hose is produced by extrusion, wherein a segment is cut out of one of the corrugated hose shells after extrusion.

Given this background, it is the object of the present invention to provide an improved openable corrugated hose.

This object is achieved by an openable corrugated hose for accommodating lines. The openable corrugated hose comprises a first corrugated hose shell, a second corrugated hose shell, a joint section at which the first corrugated hose shell and the second corrugated hose shell are connected to one another pivotably in a first end section, and a lip section provided on a second end section of at least one of the corrugated hose shells, wherein the lip section is manufactured from a different material than the corrugated hose shells.

The lip section and the corrugated hose shells are preferably manufactured from different materials, in particular different plastic materials. In particular, the lip section and the corrugated hose shells are manufactured from different thermoplastic materials. In the present case, a "different material" should be understood to mean that the lip section is manufactured from a material that differs chemically from the material from which the corrugated hose shells are manufactured. In particular, the material from which the lip section is manufactured and the material from which the corrugated hose shells are manufactured have different material characteristics, such as different elasticity moduli, different relative densities, different melting points, or the like. In a closed state of the corrugated hose, the lip section is arranged in an interior of the corrugated hose and can touch the lines. The aspect that the lip section is manufactured from a different material than the corrugated hose shells prevents the lines from being damaged by contact with the lip section during installation in the corrugated hose and in the closed state of the corrugated hose. In particular, by virtue of the material used for the lip section, the lines are protected by the lip section from damage, even in the case of vibration and oscillation. The material from which the lip section is manufactured is preferably softer than the material from which the corrugated hose shells are manufactured. Here, the difference in softness results from a differing chemical composition of the materials. The corrugated hose can also be referred to as a corrugated tube. The corrugated hose shells each form a circular-arc geometry. The lines can be electric cables or fluid lines, for example. A plurality of such lines can form a cable harness, which can be accommodated in the corrugated hose. The cable harness can also include the corrugated hose. The corrugated hose is particularly suitable for the automotive sector. The corrugated hose shells preferably each comprise an opening with an opening angle in the circumference. In this case, the opening angle of the first corrugated hose shell is preferably equal to the opening angle of the second corrugated hose shell. The opening angles can also be of different sizes. In an opened state of the corrugated hose, the opening angles can each be defined as the angle between an outermost edge of the lip sections and an outermost edge of the joint section.

According to one embodiment, a lip section is provided both on the second end section of the first corrugated hose shell and on the second end section of the second corrugated hose shell.

The first end section and the second end section of the first corrugated hose shell and the first end section and the second end section of the second corrugated hose shell are preferably arranged opposite one another. The corrugated hose is preferably produced by two-component extrusion, wherein the lip sections are formed integrally and are divided into two separate lip sections during or after the extrusion of the corrugated hose.

According to another embodiment, the lip section is connected materially to the second end section.

As a preferred option, the lip section of the first corrugated hose shell is connected materially to the second end section of the first corrugated hose shell, and the lip section of the second corrugated hose shell is connected materially to the second end section of the second corrugated hose shell. In particular, the lip section is connected to the corrugated hose shells by extrusion.

According to another embodiment, the joint section is manufactured from a different material than the corrugated hose shells.

The corrugated hose shells can be manufactured from a polyamide (PA), a polyethylene (PE), a polypropylene (PP), a polytetrafluoroethylene (PTFE) or a polyvinylchloride (PVC), for example. The joint section is preferably manufactured from a softer material than the corrugated hose shells. The joint section can be manufactured from a thermoplastic elastomer (TPE), for example.

According to another embodiment, the joint section and the lip section are manufactured from the same material, in particular from a thermoplastic elastomer.

For example, the joint section and the lip section can be manufactured from a thermoplastic polyurethane (TPU). This gives particularly good deformation properties for the joint section and the lip section. Damage to the joint section during the opening and closing of the corrugated hose is thereby prevented, allowing the openable corrugated hose to be opened and closed as often as desired. The aspect that the lip section is manufactured from a TPU makes it particularly soft and flexible.

According to another embodiment, the joint section is connected materially to the first corrugated hose shell and the second corrugated hose shell.

In particular, the joint section is a film hinge. In particular, the joint section is connected to the first corrugated hose shell and the second corrugated hose shell by extrusion. As an alternative, it is possible for the joint section not to be designed as a smooth film hinge but to have ribs, which are provided alternately with rib troughs. In the closed state of the corrugated hose, the ribs preferably extend away from an interior thereof. The ribs are preferably arranged so as to be uniformly spaced apart.

According to another embodiment, the first corrugated hose shell is arranged at least partially within the second corrugated hose shell in a closed state of the openable corrugated hose.

In this case, the first corrugated hose shell and the second corrugated hose shell overlap with an angle of overlap. The angle of overlap is defined as the angle between the outermost edges of the lip sections of the corrugated hose shells. The angle of overlap is 40 to 190°, preferably 50 to 180°, more preferably 60 to 170°, for example. In particular, the angle of overlap can also be less than 150°, e.g. 70°, 80°, 90°, 100°, 110°, 120°, 130°, or 140°. The angle of overlap can also be 70°±10°, 80°±10°, 90°±10°, 100°±10°, 110°±10°, 120°±10°, 130°±10°, or 140°±10°, for example. As an alternative, the angle of overlap can also be greater than 150°, e.g. 155°, 160°, 165°, 170°, 175° or 180°. The angle of overlap can be 155°±10°, 160°±10°, 165°±10°, 170°±10°, 175°±10°, or 180°±10°, for example. In a particularly preferred embodiment of the corrugated hose, the angle of overlap is greater than or equal to 160°, e.g. 160 to 170°. The aspect that the corrugated hose shells overlap prevents unwanted opening of the corrugated hose.

According to another embodiment, a diameter of the first corrugated hose shell is smaller than a diameter of the second corrugated hose shell.

This configuration prevents the first corrugated hose shell and/or the second corrugated hose shell from being under a preload in the closed state. Damage to the corrugated hose shells is thereby prevented, increasing the life of the corrugated hose. The first corrugated hose shell preferably comprises a multiplicity of corrugations or ribs, which extend at least partially around the first corrugated hose shell. Similarly, the second corrugated hose shell also preferably comprises a multiplicity of corrugations or ribs, which extend at least partially around the second corrugated hose shell. In particular, a corrugation trough or rib trough is provided between each pair of ribs. The first corrugated hose shell preferably has an inside diameter and an outside diameter in each of the rib troughs wherein the outside diameter is larger than the inside diameter by a material thickness of the first corrugated hose shell. The material thickness can be 0.1 to 0.5 mm, for example. In particular, the first corrugated hose shell likewise in each case has an inside diameter and an outside diameter on each of the ribs, wherein the outside diameter is larger than the inside diameter by the material thickness of the first corrugated hose shell.

Similarly, the second corrugated hose shell preferably has an inside diameter and an outside diameter in each of the rib troughs wherein the outside diameter is larger than the inside diameter by a material thickness of the second corrugated hose shell. In particular, the second corrugated hose shell has an inside diameter and an outside diameter on each of the ribs wherein the outside diameter is larger than the inside diameter by the material thickness of the second corrugated hose section. The diameters of the first corrugated hose shell are preferably smaller in each case than the corresponding diameters of the second corrugated hose shell. In particular, this means that the outside diameter of the first corrugated hose shell is smaller at the ribs, for example, than its corresponding outside diameter of the second corrugated hose shell at the ribs thereof.

As the corrugated hose is transferred from the opened state to the closed state, the first corrugated hose shell is, in particular, received at least partially in the second corrugated hose shell, with the result that the ribs of the first corrugated hose shell come to rest in the ribs of the second corrugated hose shell. It is advantageous here that the outside diameter of the first corrugated hose shell at the ribs corresponds to the inside diameter of the second corrugated hose shell at the ribs, and/or the outside diameter of the first corrugated hose shell at the rib troughs corresponds to the inside diameter of the second corrugated hose shell at the rib troughs, or is in each case only slightly larger or smaller. This configuration ensures that the first corrugated hose shell and/or the second corrugated hose shell is/are free from pre-stress or is/are at least only slightly pre-stressed in the closed state of the corrugated hose. In particular, the diameter of the first corrugated hose shell differs from the diameter of the second corrugated hose shell in such a way that the first corrugated hose shell is accommodated in a manner free from stress in the second corrugated hose shell in the closed state of the corrugated hose. Excessive mechanical loading of the corrugated hose shells as the corrugated hose is closed and/or in the closed state thereof is thereby prevented. As a result, said hoses have a particularly long life and are protected from damage.

According to another embodiment, the diameter of the first corrugated hose shell is 5 to 15%, preferably 6 to 14%, more preferably 7 to 13%, more preferably 8 to 12%, more preferably 9 to 11%, more preferably 10% smaller than the diameter of the second corrugated hose shell.

For example, the outside diameter of the first corrugated hose shell at the ribs can have a value of 20 mm and the outside diameter of the second corrugated hose shell at the ribs can have a value of 21.2 mm.

According to another embodiment, the first corrugated hose shell and/or the second corrugated hose shell can be deformed elastically as the corrugated hose is transferred from an opened state to a closed state thereof.

The corrugated hose shells preferably have the openings in the circumference mentioned above. As the corrugated hose is transferred from the opened state to the closed state, the opening in the first corrugated hose shell is compressed and the opening in the second corrugated hose shell is expanded. At the same time, the first corrugated hose shell slides into the second corrugated hose shell.

According to another embodiment, the corrugated hose comprises a latching device for latching the first corrugated hose shell to the second corrugated hose shell when transferring the corrugated hose from an opened state to a closed state thereof.

Unwanted opening or unfolding of the corrugated tube is thereby prevented. This configuration improves the operational reliability of the corrugated tube. The latching device is preferably releasable, allowing the corrugated hose to be opened again after being latched.

According to another embodiment, the first corrugated hose shell and the second corrugated hose shell each have encircling ribs, wherein the latching device has latching noses provided on the ribs of the first corrugated hose shell and latching hooks provided on the ribs of the second corrugated hose shell, wherein the latching noses are designed to engage positively in the latching hooks and/or wherein the latching noses are designed to engage positively in the latching hooks in a radial direction of the openable corrugated hose.

For example, the ribs of the first corrugated hose shell have two latching noses arranged opposite one another and at least partially encircling the corrugated hose, and the ribs of the second corrugated hose shell have two latching hooks arranged opposite one another and at least partially encircling the corrugated hose. As the latching noses are latched with the latching hooks, the latching noses and/or the latching hooks are deformed elastically. The ribs of the first corrugated hose shell preferably taper in the direction of the second end section of the first corrugated hose shell. In the closed state of the corrugated hose, the radial direction of the corrugated hose is oriented radially outward from a central axis of said hose. In the closed state of the corrugated hose, central axes of the corrugated hose shells and of the corrugated hose can be arranged one on top of the other.

Furthermore, a cable harness for the automotive sector, having one or more electric cables and an openable corrugated hose of this kind, is provided, wherein the one or more electric cables are guided in the openable corrugated hose over a length thereof.

The cable harness can also comprise fluid lines guided in the corrugated hose.

A method for producing an openable corrugated hose of this kind is further provided, comprising producing the openable corrugated hose by two-component extrusion, extruding the first corrugated hose shell and the second corrugated hose shell with a first component, and extruding the joint section and the lip section with a second component.

The first component is a PA, PE, PPE, PTFE, or PVC, for example, and the second component can be a TPE. The first component can also be referred to as a hard component and the second component can also be referred to as a soft component. The corrugated hose is preferably fed to a corrugator directly after extrusion, said corrugator forming the ribs on the corrugated hose shells. It is optionally also possible to provide a third or fourth component, thus allowing the corrugated hose shells and/or the joint section and the lip sections to be manufactured from different materials.

According to one embodiment, the lip section is divided in a longitudinal direction of the openable corrugated hose after or during extrusion.

The lip section is preferably divided centrally into two lip sections with the aid of a cutting device. By virtue of the aspect that a segment is not cut out of any of the corrugated hose shells during the production of the corrugated hose, the method involves particularly low consumption of material and is therefore economical.

Further possible implementations of the invention also comprise combinations, not explicitly mentioned, of features or embodiments described above or below in relation to the illustrative embodiments. Here, a person skilled in the art will also add individual aspects as improvements or supplementary features to the respective basic form of the invention.

Further advantageous embodiments and aspects of the invention are the subject matter of the dependent claims and of the illustrative embodiments of the invention which are described below. The invention is explained in greater detail below by means of preferred embodiments with reference to the attached figures.

In the figures, identical or functionally identical elements have been provided with the same reference signs, unless indicated otherwise.

Figure 1:
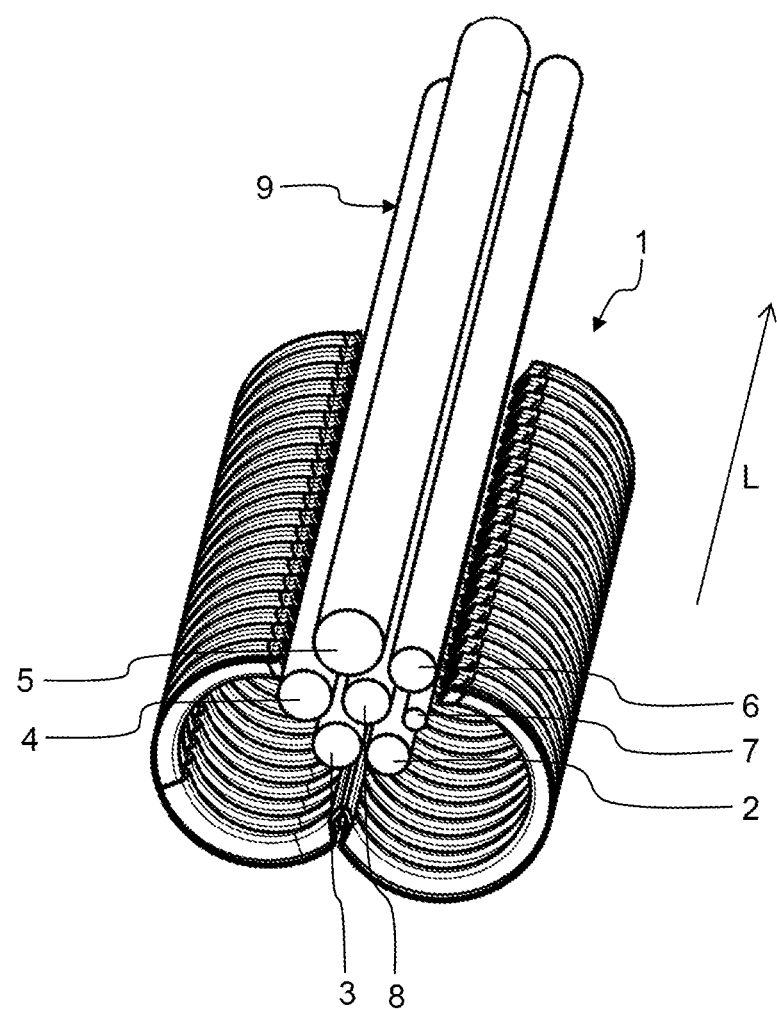
FIG. 1 shows a schematic perspective view of one embodiment of an openable corrugated hose in an opened state.
Figure 2:
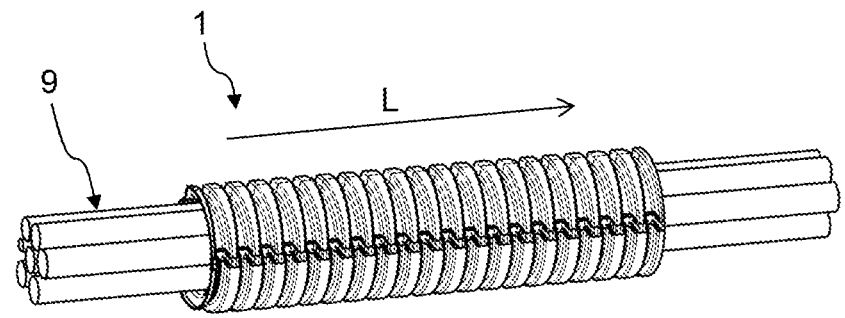
FIG. 2 shows another schematic perspective view of the openable corrugated hose shown in FIG. 1 in a closed state.

FIG. 1 shows a schematic perspective view of a folding, closable or openable corrugated hose 1 in an opened state. FIG. 2 shows a schematic perspective view of the corrugated hose 1 in a closed state. The corrugated hose 1 can also be referred to as a corrugated tube. The corrugated hose 1 is suitable particularly for use in the automotive sector. The corrugated hose 1 can also be used in any other vehicles or in static applications.

The corrugated hose 1 is designed to accommodate lines 2 to 8. The number of lines 2 to 8 is arbitrary. The lines 2 to 8 can form a cable harness 9. The cable harness 9 can also include the corrugated hose 1. For example, the cable harness 9, as shown in FIGS. 1 and 2, can accommodate seven lines 2 to 8. The lines 2 to 8 can be electric cables or fluid lines, for example. The corrugated hose 1 has a longitudinal direction L.

Figure 3:
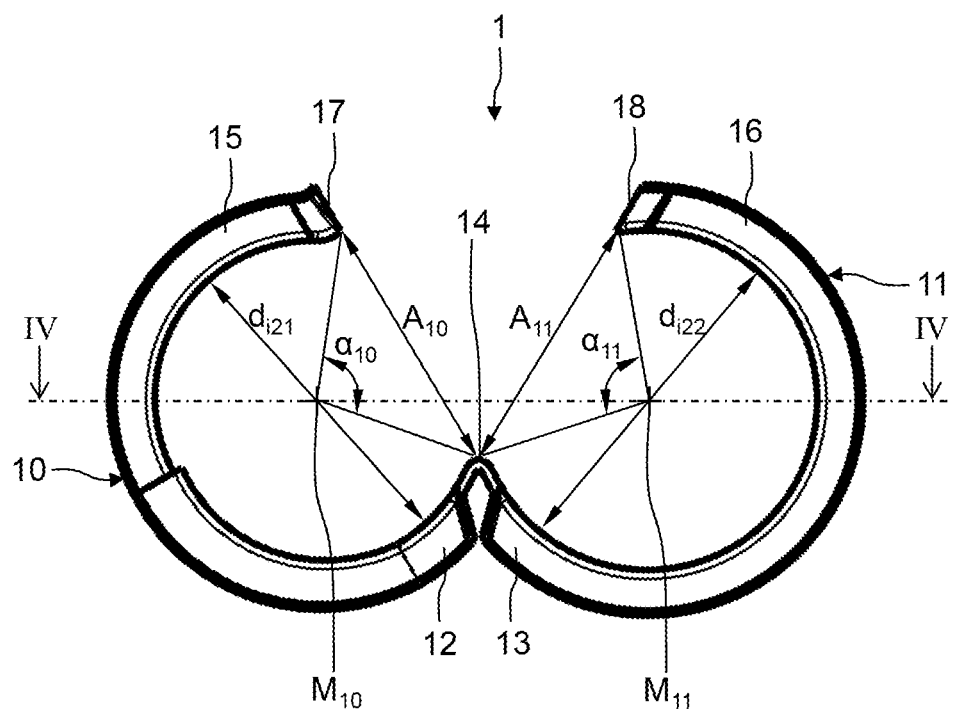
FIG. 3 shows a schematic front view of the openable corrugated hose shown in FIG. 1.
Figure 4:
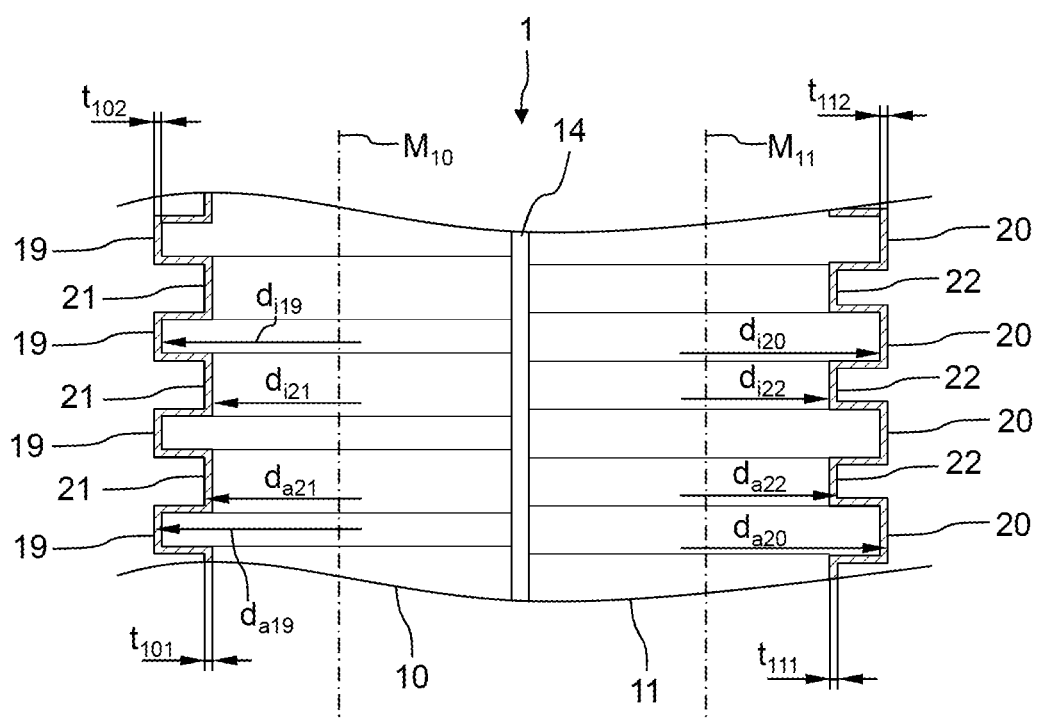
FIG. 4 shows a schematic sectional view of the corrugated hose according to section line IV-IV in FIG. 3.
Figure 5:
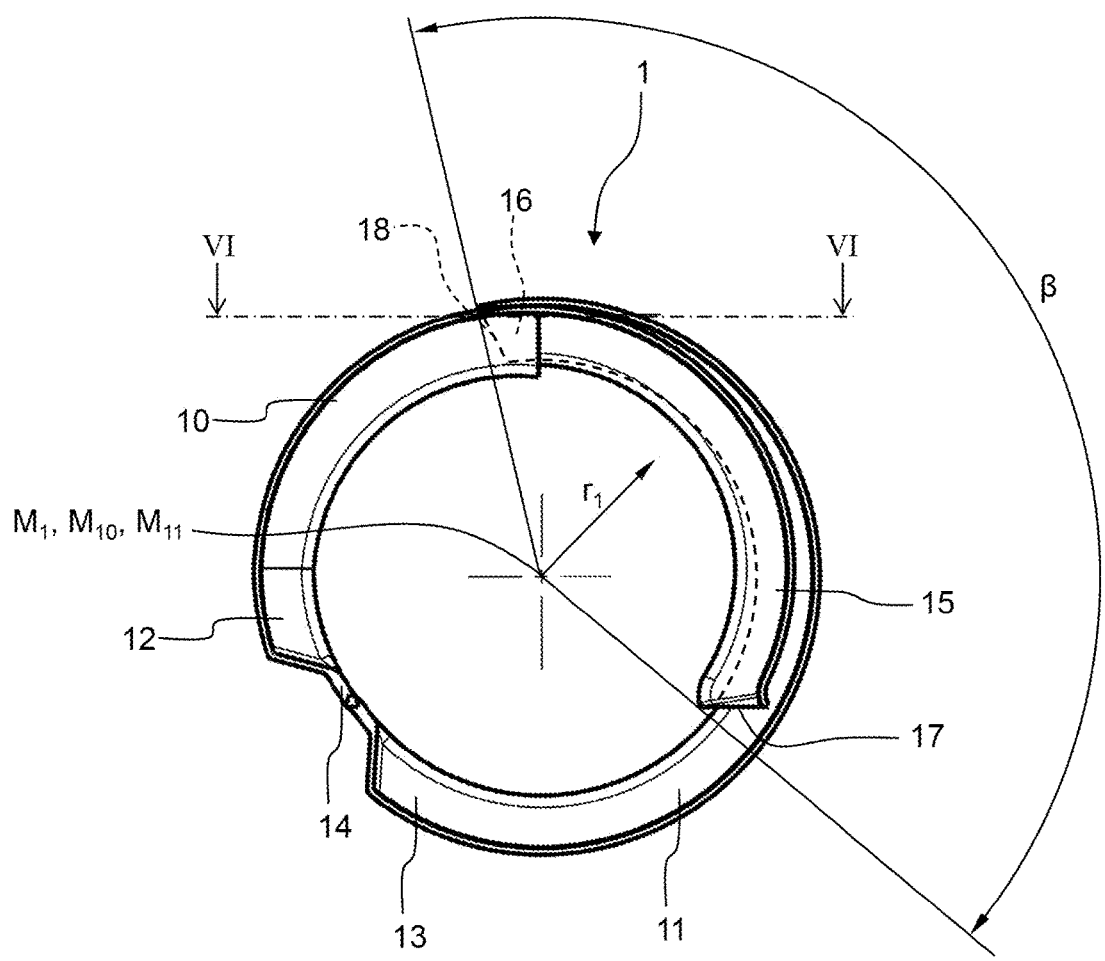
FIG. 5 shows another schematic front view of the corrugated hose shown in FIG. 1.

FIG. 3 shows a schematic front view of the corrugated hose 1 in the opened state without the cable harness 9. FIG. 4 shows a schematic sectional view of the corrugated hose 1 according to section line IV-IV in FIG. 3. FIG. 5 shows a schematic front view of the corrugated hose 1 in the closed state. In the text which follows, reference will be made simultaneously to FIGS. 3 to 5.

The corrugated hose 1 comprises a first corrugated hose shell 10 and a second corrugated hose shell 11. The corrugated hose shells 10, 11 are curved in the form of an arc, in particular in the form of a circular arc, and can each have the form of two thirds of a circle in cross section, for example. The corrugated hose shells 10, 11 are tubular with lateral slotting. The corrugated hose shells 10, 11 each have a central axis $M_{10}$, $M_{11}$. The corrugated hose shells 10, 11 can also be referred to as corrugated hose sections.

The first corrugated hose shell 10 and the second corrugated hose shell 11 are each connected pivotably to one another in a first end section 12, 13 with the aid of a joint section 14. The joint section 14 is preferably designed as a film hinge. The joint section 14 is connected materially to the first corrugated hose shell 10 and the second corrugated hose shell 11. The joint section 14 is manufactured from a different material than the corrugated hose shells 10, 11. The corrugated hose shells 10, 11 are manufactured from PA, PE, PP, PTFE, or PVC, for example. The joint section 14 is preferably manufactured from a TPE, e.g. a TPU. In particular, the joint section 14 is extruded onto the corrugated hose shells 10, 11.

A lip section 17, 18 is provided in each case on a second end section 15, 16 of the corrugated hose shells 10, 11 situated opposite the respective first end section 12, 13. The lip sections 17, 18 are manufactured from a different material than the corrugated hose shells 10, 11. A lip section 17, 18 of this kind is in each case preferably provided both on the second end section 15 of the first corrugated hose shell 10 and on the second end section 16 of the second corrugated hose shell 11. The lip sections 17, 18 are connected materially to the second end sections 15, 16. The joint section 14 and the lip sections 17, 18 are preferably manufactured from the same material. The lip sections 17, 18 are manufactured from a softer material than the corrugated hose shells 10, 11. The lip sections 17, 18 are preferably extruded onto the corrugated hose shells 10, 11. By virtue of the aspect that the lip sections 17, 18 are manufactured from a softer material than the corrugated hose shells 10, 11, damage to the cable harness 9 during the introduction thereof into the opened corrugated hose 1 can be prevented. In the closed state of the corrugated hose 1, lip section 17 is arranged in the interior of the corrugated hose 1. Owing to the softness of the material of lip section 17, damage to the cable harness 9 due to contact with lip section 17 can be prevented even in the case of oscillation and vibration, i.e. during the operation of the corrugated hose 1. This increases the operational reliability and life of the cable harness 9.

The first corrugated hose shell 10 comprises a multiplicity of corrugations or ribs 19, which at least partially encircle the first corrugated hose shell 10. Similarly, the second corrugated hose shell 11 comprises a multiplicity of corrugations or ribs 20, which at least partially encircle the second corrugated hose shell 11. The ribs 19, 20 are arranged uniformly spaced apart in the longitudinal direction L. A corrugation trough or rib trough 21 is provided between each pair of ribs 19, and a corrugation trough or rib trough 22 is provided between each pair of ribs 20. In each of the rib troughs 21, the first corrugated hose shell 10 has an inside diameter $d_{i21}$ and an outside diameter $d_{a21}$, wherein the outside diameter $d_{a21}$ is larger by a material thickness $t_{101}$ than the inside diameter $d_{i21}$. Material thickness $t_{101}$ can be 0.1 to 0.7 mm, for example. At each of the ribs 19, the first corrugated hose shell 10 has an inside diameter $d_{i19}$ and an outside diameter $d_{a19}$, wherein the outside diameter $d_{a19}$ is larger by a material thickness $t_{102}$ than the inside diameter $d_{i19}$. Material thickness $t_{102}$ can be 0.1 to 0.7 mm, for example. Material thickness $t_{101}$ is preferably larger than material thickness $t_{102}$.

Similarly, the second corrugated hose shell 11 has an inside diameter $d_{i22}$ and an outside diameter $d_{a22}$ in each of the rib troughs 22, wherein outside diameter $d_{a22}$ is larger by a material thickness $t_{111}$ than inside diameter $d_{i22}$. Material thickness $t_{111}$ can correspond to material thickness $t_{101}$. At each of the ribs 20, the second corrugated hose shell 11 has an inside diameter $d_{i20}$ and an outside diameter $d_{a20}$, wherein outside diameter $d_{a20}$ is larger by a material thickness $t_{112}$ than inside diameter $d_{i20}$. Material thickness $t_{112}$ can correspond to material thickness $t_{102}$. The diameters $d_{a19}$, $d_{i19}$, $d_{a21}$ and $d_{i21}$ of the first corrugated hose shell 10 are each preferably smaller than the corresponding diameters $d_{a20}$, $d_{i20}$, $d_{a22}$, and $d_{i22}$ of the second corrugated hose shell 11. In particular, this means that the outside diameter $d_{a19}$ of the first corrugated hose shell 10 is smaller than its corresponding outside diameter $d_{a20}$ of the second corrugated hose shell 11. For example, the outside diameter $d_{a19}$ of the first corrugated hose shell 10 can be 5 to 15%, preferably 6 to 14%, more preferably 7 to 13%, more preferably 8 to 12%, more preferably 9 to 11%, preferably 10% smaller than the outside diameter $d_{a20}$ of the second corrugated hose shell 11. The same applies to diameters $d_{i19}$, $d_{a21}$ and $d_{i21}$ and their corresponding diameters $d_{i20}$, $d_{a22}$, and $d_{i22}$. For example, outside diameter $d_{a19}$ has a value of 20 mm and outside diameter $d_{a20}$ has a value of 21.2 mm.

As the corrugated hose 1 is transferred from the opened state to the closed state, the first corrugated hose shell 10 is received in the second corrugated hose shell 11 such that ribs 19 come to rest in ribs 20. It is advantageous here that outside diameter $d_{a19}$ corresponds to inside diameter $d_{i20}$ and outside diameter $d_{a21}$ corresponds to inside diameter $d_{i22}$ or is in each case only slightly larger or smaller. This configuration ensures that the first corrugated hose shell 10 and/or the second corrugated hose shell 11 is/are free from pre-stress in the closed state of the corrugated hose 1 or is/are at least only slightly pre-stressed. Excessive mechanical loading of the corrugated hose shells 10, 11 as the corrugated hose 1 is closed and/or in the closed state thereof is thereby prevented. As a result, said hoses have a particularly long life and are protected from damage.

The corrugated hose shells 10, 11 each include an opening angle $\alpha_{10}$, $\alpha_{11}$. Here, the opening angle $\alpha_{10}$ of the first corrugated hose shell 10 is equal to the opening angle $\alpha_{11}$ of the second corrugated hose shell 11. The opening angles $\alpha_{10}$, $\alpha_{10}$ can also differ slightly in size. For example, the opening angles $\alpha_{10}$, $\alpha_{11}$ each have a value of between 95 and 110°. The opening angles $\alpha_{10}$, $\alpha_{11}$ are each defined as the angle between an outermost edge of the lip sections 17, 18 and an outermost edge of the joint section 14. The first corrugated hose shell 10 furthermore has an opening $A_{10}$ which is smaller than inside diameter $d_{i21}$. The second corrugated hose shell 11 has an opening $A_{11}$ which is smaller than inside diameter $d_{i22}$. Since the corrugated hose shells 10, 11 have different diameters $d_{i21}$, $d_{i22}$ but the same opening angles $\alpha_{10}$, $\alpha_{11}$, opening $A_{11}$ is at least slightly larger than opening $A_{10}$. The openings $A_{10}$, $A_{11}$ can also be the same size.

As the corrugated hose 1 is transferred from the opened state shown in FIGS. 1, 3, and 4 into the closed state shown in FIGS. 2 and 5, the first corrugated hose shell 10 is received at least partially in the second corrugated hose shell 11. As the corrugated hose 1 is closed, opening $A_{11}$ is expanded and opening $A_{10}$ is compressed. During this process, the first corrugated hose shell 10 and/or the second corrugated hose shell 11 deform elastically. As FIG. 5 shows, the first corrugated hose shell 10 and the second corrugated hose shell 11 overlap with an angle of overlap β, which is defined as the angle between the outermost edges of the lip sections 17, 18. The angle of overlap β is 40 to 190°, preferably 50 to 180°, more preferably 60 to 170°, for example. In particular, the angle of overlap can also be less than 150°, e.g. 70°, 80°, 90°, 100°, 110°, 120°, 130°, or 140°. The angle of overlap β can be 70°±10°, 80°±10°, 90°±10°, 100°±10°, 110°±10°, 120°±10°, 130°±10°, or 140°±10°. As an alternative, the angle of overlap β can also be larger than 150°, e.g. 155°, 160°, 165°, 170°, 175°, or 180°. The angle of overlap β can be 155°±10°, 160°±10°, 165°±10°, 170°±10°, 175°±10°, or 180°±10°, for example. In a particularly preferred embodiment of the corrugated hose 1, the angle of overlap β is greater than or equal to 160°, e.g. 160 to 170°.

Figure 6:
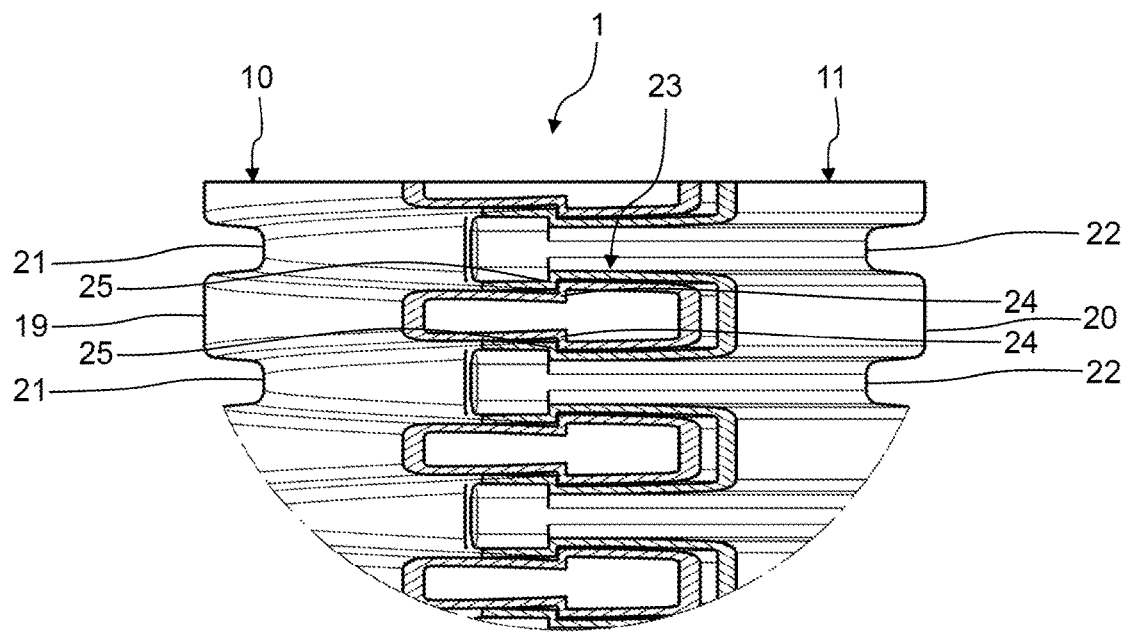
FIG. 6 shows a schematic sectional view of the corrugated hose according to section line VI-VI in FIG. 5.

FIG. 6 shows a sectional view of the corrugated hose 1 according to section line VI-VI in FIG. 5. The corrugated hose 1 furthermore comprises a latching device 23 for latching the first corrugated hose shell 10 to the second corrugated hose shell 11 as the corrugated hose 1 is transferred from the opened state to the closed state. The first corrugated hose shell 10 and the second corrugated hose shell 11 each have the encircling ribs 19, 20, which engage in one another in the closed state of the corrugated hose 1. As FIG. 6 shows, the ribs 19 taper in the direction of the second end section 15 of the first corrugated hose shell 10. The latching device 23 has latching noses 24 provided on the ribs 19 of the first corrugated hose shell 10 and latching hooks 25 provided on the ribs 20 of the second corrugated hose shell 11, wherein the latching noses 24 are designed to engage positively in the latching hooks 25.

In this case, each rib 19 can be assigned two mutually opposite latching noses 24 and each rib 20 can be assigned two latching hooks 25 arranged opposite one another. The latching noses 24 and the latching hooks 25 can at least partially encircled the corrugated hose 1. As the latching noses 24 latch with the latching hooks 25, the latching noses 24 and/or the latching hooks 25 are deformed elastically. The latching noses 24 are designed to engage positively in the latching hooks 25 in a radial direction $r_1$ (FIG. 5) of the corrugated hose 1, i.e. radially outwards from a central axis $M_1$. With the aid of the latching device 23, unwanted unfolding or opening of the corrugated hose 1 can be reliably prevented.

Figure 7:
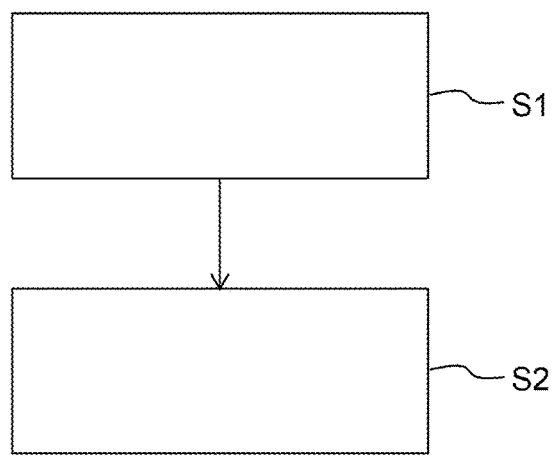
FIG. 7 shows a schematic block diagram of one embodiment of a method for producing the corrugated hose shown in FIG. 1.
Figure 8:
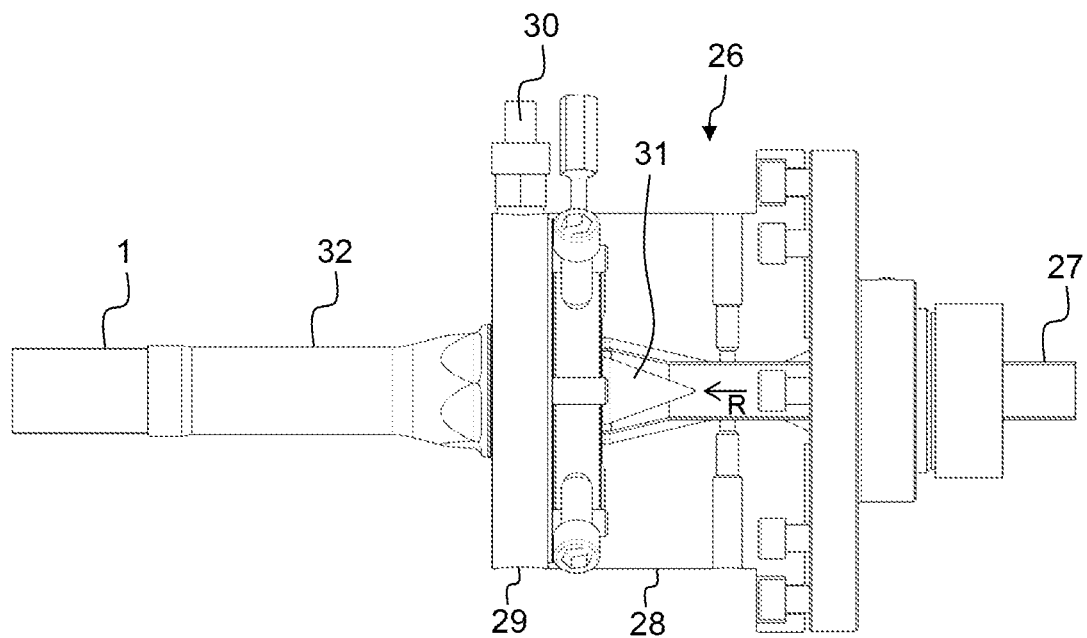
FIG. 8 shows a schematic sectional view of one embodiment of an extrusion head for carrying out the method shown in FIG. 7.

In the case of a method, shown schematically in FIG. 7 with the aid of a block diagram, for producing a corrugated hose 1 of this kind, the corrugated hose 1 is produced in a step S1 with the aid of an extrusion head 26, shown in a schematic sectional view in FIG. 8, by two-component extrusion. The extrusion head 26 comprises a first connection flange 27, to which a main extruder or first extruder for plasticizing a first or hard component can be connected. The first corrugated hose shell 10 and the second corrugated hose shell 11 are manufactured from the first component. The first component is PA, PE, PP, PTFE or PVC. The connection flange 27 is arranged on a housing 28 of the extrusion head 26. The extrusion head 26 furthermore comprises a plate-type distributor or distributor plate 29, which is likewise connected to the housing 28. A second connection flange 30 is connected to the distributor plate 29. A secondary extruder or second extruder for plasticizing a second or soft component can be connected to the second connection flange 30. The lip sections 17, 18 and/or the joint section 14 are manufactured from the second component. The second component is a TPE.

Also accommodated in the housing 28 is a melt divider or "torpedo" 31, the cross section of which widens continuously in a flow direction R of the plasticized first component. The distributor plate 29, in which the plasticized second component is fed into the plasticized first component, is arranged downstream of the torpedo 31 in the flow direction R. Arranged downstream of the distributor plate 29 is an injection die or shaping die 32, which gives the corrugated hose 1 the desired geometry. Here, the corrugated hose 1 does not initially have any ribs 19, 20 directly after the shaping die 32. A corrugator (not shown in FIG. 8), which shapes the not yet cooled corrugated hose 1 to form the ribs 19, 20, is therefore arranged downstream of the shaping die 32.

The lip sections 17, 18 are initially still connected to one another materially downstream of the shaping die 32. In a step S2 that may occur during or after extrusion, the lip sections 17, 18 connected to one another in a materially integral manner are divided in the longitudinal direction L of the corrugated hose 1 such that two mutually separate lip sections 17, 18 are formed. The division of the lip sections 17, 18 is preferably performed downstream of the corrugator.

Figure 9:
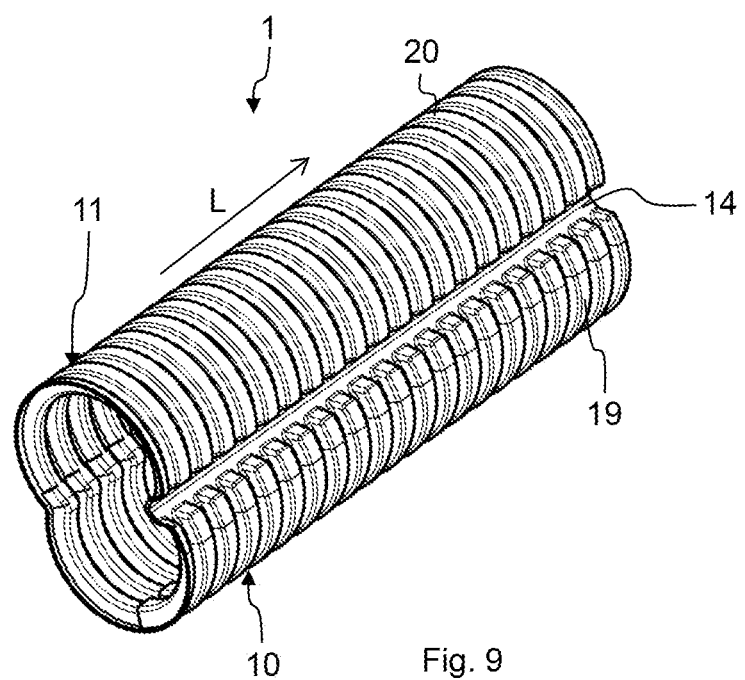
FIG. 9 shows another schematic perspective view of the corrugated hose shown in FIG. 1.
Figure 10:
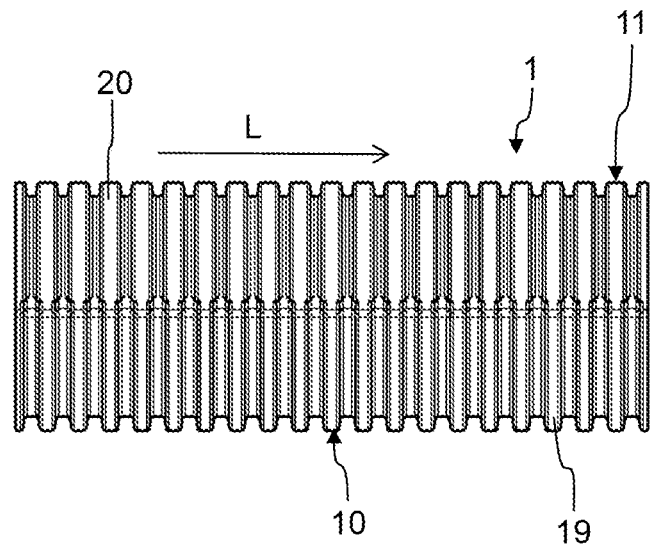
FIG. 10 shows a schematic side view of the corrugated hose shown in FIG. 1.
Figure 11:
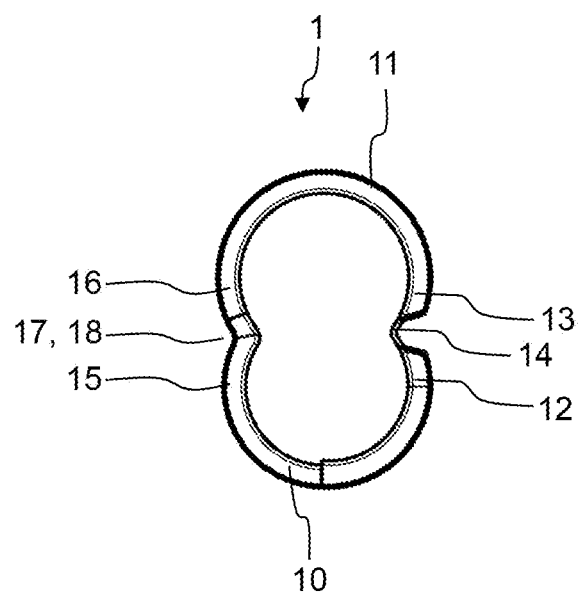
FIG. 11 shows another schematic front view of the corrugated hose shown in FIG. 1.
Figure 12:
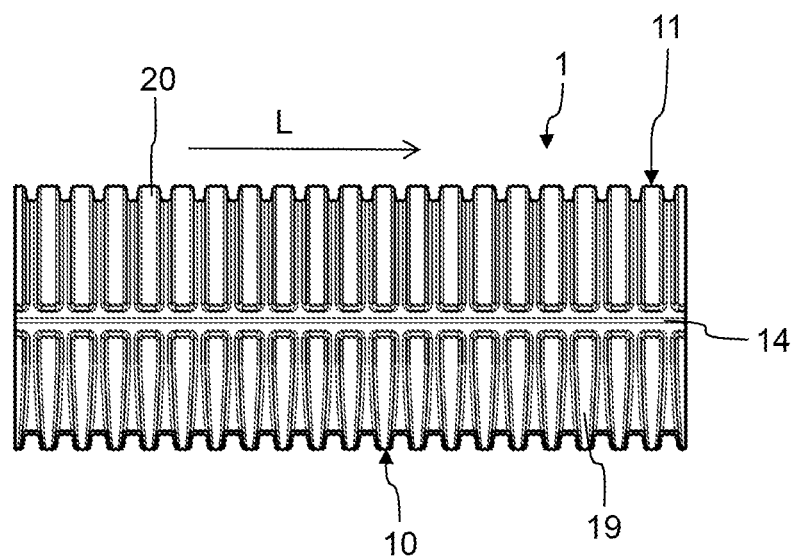
FIG. 12 shows another schematic side view of the corrugated hose shown in FIG. 1.

FIG. 9 shows a schematic perspective view of the corrugated hose 1. FIG. 10 shows a schematic side view of the corrugated hose 1 looking towards the lip sections 17, 18. FIG. 11 shows a schematic front view of the corrugated hose 1 and FIG. 12 shows another schematic side view of the corrugated hose 1 looking towards the joint section 14. FIGS. 9 to 12 show the corrugated hose 1 after step S1, i.e. before the division of the lip sections 17, 18.

As FIGS. 9, 11 and 12 show, the ribs 19, 20 are interrupted in the region of the joint section 14, with the result that said joint section forms a film hinge between the corrugated hose shells 10, 11. As can furthermore be seen in FIG. 12, ribs 19 taper at least in the region of the latching device 23, allowing them to be snapped into ribs 20 from the inside. In step S2, the lip sections 17, 18 can be divided centrally with the aid of a cutting device, for example, such as a blade or a laser cutting device.

Figure 13:
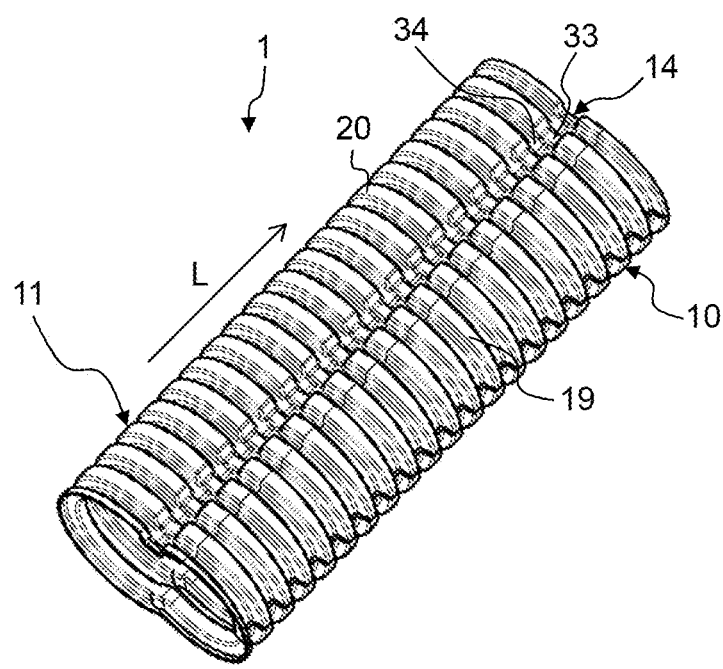
FIG. 13 shows a schematic perspective view of another embodiment of a corrugated hose.

FIG. 13 shows a schematic perspective view of another embodiment of the corrugated hose 1 looking toward the joint section 14. The corrugated hose 1 shown in FIG. 13 differs from the embodiment of the corrugated hose 1 shown in FIGS. 1 to 6 and 9 to 12 only in that the joint section 14 is not designed as a smooth film hinge but comprises alternately arranged corrugations or ribs 33 and corrugation troughs or rib troughs 34. Ribs 33 can be designed as continuations of ribs 19, 20.

Although the present invention has been described with reference to illustrative embodiments, it can be modified in many different ways.

LIST OF REFERENCE SIGNS 1 corrugated hose
2 line
3 line
4 line
5 line
6 line
7 line
8 line
9 cable harness
10 corrugated hose shell
11 corrugated hose shell
12 end section
13 end section
14 joint section
15 end section
16 end section
17 lip section
18 lip section
19 rib
20 rib
21 rib trough
22 rib trough
23 latching device
24 latching nose
25 latching hook
26 extrusion head
27 connection flange
28 housing
29 distributor plate
30 connection flange
31 torpedo
32 shaping die
33 rib
34 rib trough
$A_{10}$ opening
$A_{11}$ opening
$d_{a19}$ diameter
$d_{a20}$ diameter
$d_{a21}$ diameter $d_{a22}$ diameter
$d_{i19}$ diameter
$d_{i20}$ diameter
$d_{i21}$ diameter
$d_{i22}$ diameter
L longitudinal direction
$M_1$ central axis
$M_{10}$ central axis
$M_{11}$ central axis
R flow direction
$r_1$ radial direction
S1 step
S2 step
$t_{101}$ material thickness
$t_{102}$ material thickness
$t_{111}$ material thickness
$t_{112}$ material thickness
$\alpha_{10}$ opening angle
$\alpha_{11}$ opening angle
$\beta$ angle of overlap

The invention claimed is:

1. An openable corrugated hose for accommodating lines, comprising:
a first corrugated hose shell,
a second corrugated hose shell,
a joint section, at which the first corrugated hose shell and the second corrugated hose shell are each connected to one another pivotably in a first end section, and
a lip section, which is provided on a second end section of at least one of the corrugated hose shells, wherein the lip section is manufactured from a different material than the corrugated hose shells,
wherein a diameter of the first corrugated hose shell is smaller than a diameter of the second corrugated hose shell.

2. The openable corrugated hose according to claim 1, wherein the lip section is provided both on the second end section of the first corrugated hose shell and on the second end section of the second corrugated hose shell.

3. The openable corrugated hose according to claim 1, wherein the lip section is connected materially to the second end section.

4. The openable corrugated hose according to claim 1, wherein the joint section is manufactured from a different material than the corrugated hose shells.

5. The openable corrugated hose according to claim 1, wherein the joint section and the lip section are manufactured from the same material which is a thermoplastic elastomer.

6. The openable corrugated hose according to claim 1, wherein the joint section is connected materially to the first corrugated hose shell and the second corrugated hose shell.

7. The openable corrugated hose according to claim 1, wherein the first corrugated hose shell is arranged at least partially within the second corrugated hose shell in a closed state of the openable corrugated hose.

8. The openable corrugated hose according to claim 1, wherein the diameter of the first corrugated hose shell is 5 to 15% smaller than the diameter of the second corrugated hose shell.

9. The openable corrugated hose according to claim 1, wherein one or both of the first corrugated hose shell and the second corrugated hose shell can be deformed elastically as the corrugated hose is transferred from an opened state to a closed state.

10. The openable corrugated hose according to claim 1, further comprising a latching device for latching the first corrugated hose shell to the second corrugated hose shell when transferring the corrugated hose from an opened state to a closed state.

11. A cable harness for the automotive sector, comprising one or more electric cables and an openable corrugated hose according to claim 1, wherein the one or more electric cables are guided in the openable corrugated hose over a length thereof.

12. An openable corrugated hose for accommodating lines, comprising:
a first corrugated hose shell,
a second corrugated hose shell,
a joint section, at which the first corrugated hose shell and the second corrugated hose shell are each connected to one another pivotably in a first end section,
a lip section, which is provided on a second end section of at least one of the corrugated hose shells, wherein the lip section is manufactured from a different material than the corrugated hose shells, and
a latching device for latching the first corrugated hose shell to the second corrugated hose shell when transferring the corrugated hose from an opened state to a closed state,
wherein the first corrugated hose shell and the second corrugated hose shell each have encircling ribs,
wherein the latching device has latching noses provided on the ribs of the first corrugated hose shell and latching hooks provided on the ribs of the second corrugated hose shell, and
wherein the latching noses are designed to engage positively in the latching hooks in a radial direction of the openable corrugated hose.

13. The openable corrugated hose according to claim 12, wherein the lip section is provided both on the second end section of the first corrugated hose shell and on the second end section of the second corrugated hose shell.

14. The openable corrugated hose according to claim 12, wherein the lip section is connected materially to the second end section.

15. The openable corrugated hose according to claim 12, wherein the joint section is manufactured from a different material than the corrugated hose shells.

16. The openable corrugated hose according to claim 12, wherein the joint section and the lip section are manufactured from the same material which is a thermoplastic elastomer.

17. The openable corrugated hose according to claim 12, wherein the joint section is connected materially to the first corrugated hose shell and the second corrugated hose shell.

18. A method for producing an openable corrugated hose comprising:
a first corrugated hose shell,
a second corrugated hose shell,
a joint section, at which the first corrugated hose shell and the second corrugated hose shell are each connected to one another pivotably in a first end section, and
a lip section, which is provided on a second end section of at least one of the corrugated hose shells, wherein the lip section is manufactured from a different material than the corrugated hose shells,
the method comprising:
producing the openable corrugated hose by two-component extrusion,
extruding the first corrugated hose shell and the second corrugated hose shell with a first component, and
extruding the joint section and the lip section with a second component.

19. The method according to claim 18, wherein the lip section is divided in a longitudinal direction of the openable corrugated hose during or after extrusion.

\* \* \* \* \*